(12) United States Patent
Canter

(10) Patent No.: US 6,369,546 B1
(45) Date of Patent: Apr. 9, 2002

(54) DISTRIBUTED CONVERTER AND METHOD FOR EQUALIZING LITHIUM-ION BATTERIES

(75) Inventor: Stanley Canter, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/816,981

(22) Filed: Mar. 23, 2001

(51) Int. Cl.[7] .................................................. H02J 7/00
(52) U.S. Cl. .......................................... 320/118; 320/116
(58) Field of Search .................................. 320/118, 116, 320/117, 132; 307/66

(56) References Cited

U.S. PATENT DOCUMENTS 6,150,795 A * 11/2000 Kutkut et al. ................ 320/118

* cited by examiner

Primary Examiner—Peter S. Wong
Assistant Examiner—Lawrence Luk
(74) Attorney, Agent, or Firm—Terje Gudmestad

(57) ABSTRACT

A system and method for charging a lithium-ion battery in which the battery is charged by a bulk charger at a high rate until one or more of the cells reaches a predetermined series threshold voltage. When a predetermined cell threshold voltage is reached, the controller provides instructions as to whether to reduce or terminate the cell charging by the bulk charger. At this point in time, the redundant power supplies begin charging each cell individually through balancing switches. The balancing switches will turn off as their respective cells reach a predetermined cell threshold voltage. Ultimately, each cell will be fully charged to an identical high charge state.

22 Claims, 7 Drawing Sheets

Nucleotide and Amino Acid Sequence of AIM-I

```
       GGCACGAGCGGCTGCCTGGCTGACTTACAGCAGTCAGACTCTGACAGGTTCATGGCTATG
 -51   -+---------+---------+---------+---------+---------+--------    8
       CCGTGCTCGCCGACGGACCGACTGAATGTCGTCAGTCTGAGACTGTCCAAGTACCGATAC
 -16                                                          M  A  M   3

ATGGAGGTCCAGGGGGGACCCAGCCTGGGACAGACCTGCGTGCTGATCGTGATCTTCACA
   9   -+---------+---------+---------+---------+---------+--------   68
       TACCTCCAGGTCCCCCCTGGGTCGGACCCTGTCTGGACGCACGACTAGCACTAGAAGTGT
   4    M  E  V  Q  G  G  P  S  L  G  Q  T  C  V  L  I  V  I  F  T    23

GTGCTCCTGCAGTCTCTCTGTGTGGCTGTAACTTACGTGTACTTTACCAACGAGCTGAAG
  69   -+---------+---------+---------+---------+---------+--------  128
       CACGAGGACGTCAGAGAGACACACCGACATTGAATGCACATGAAATGGTTGCTCGACTTC
  24    V  L  L  Q  S  L  C  V  A  V  T  Y  V  Y  F  T  N  E  L  K    43

CAGATGCAGGACAAGTACTCCAAAAGTGGCATTGCTTGTTTCTTAAAAGAAGATGACAGT
 129   -+---------+---------+---------+---------+---------+--------  188
       GTCTACGTCCTGTTCATGAGGTTTTCACCGTAACGAACAAAGAATTTTCTTCTACTGTCA
  44    Q  M  Q  D  K  Y  S  K  S  G  I  A  C  F  L  K  E  D  D  S    63

TATTGGGACCCCAATGACGAAGAGAGTATGAACAGCCCCTGCTGGCAAGTCAAGTGGCAA
 189   -+---------+---------+---------+---------+---------+--------  248
       ATAACCCTGGGGTTACTGCTTCTCTCATACTTGTCGGGGACGACCGTTCAGTTCACCGTT
  64    Y  W  D  P  N  D  E  E  S  M  N  S  P  C  W  Q  V  K  W  Q    83

CTCCGTCAGCTCGTTAGAAAGATGATTTTGAGAACCTCTGAGGAAACCATTTCTACAGTT
 249   -+---------+---------+---------+---------+---------+--------  308
       GAGGCAGTCGAGCAATCTTTCTACTAAAACTCTTGGAGACTCCTTTGGTAAAGATGTCAA
  84    L  R  Q  L  V  R  K  M  I  L  R  T  S  E  E  T  I  S  T  V   103

CAAGAAAAGCAACAAAATATTTCTCCCCTAGTGAGAGAAAGAGGTCCTCAGAGAGTAGCA
 309   -+---------+---------+---------+---------+---------+--------  368
       GTTCTTTTCGTTGTTTTATAAAGAGGGGATCACTCTCTTTCTCCAGGAGTCTCTCATCGT
 104    Q  E  K  Q  Q  N  I  S  P  L  V  R  E  R  G  P  Q  R  V  A   123

GCTCACATAACTGGGACCAGAGGAAGAAGCAACACATTGTCTTCTCCAAACTCCAAGAAT
 369   -+---------+---------+---------+---------+---------+--------  428
       CGAGTGTATTGACCCTGGTCTCCTTCTTCGTTGTGTAACAGAAGAGGTTTGAGGTTCTTA
 124    A  H  I  T  G  T  R  G  R  S  N  T  L  S  S  P  N  S  K  N   143

GAAAAGGCTCTGGGCCGCAAAATAAACTCCTGGGAATCATCAAGGAGTGGGCATTCATTC
 429   -+---------+---------+---------+---------+---------+--------  488
       CTTTTCCGAGACCCGGCGTTTTATTTGAGGACCCTTAGTAGTTCCTCACCCGTAAGTAAG
 144    E  K  A  L  G  R  K  I  N  S  W  E  S  S  R  S  G  H  S  F   163
```

FIG.1A

```
       CTGAGCAACTTGCACTTGAGGAATGGTGAACTGGTCATCCATGAAAAAGGGTTTTACTAC
489    -+---------+---------+---------+---------+---------+--------  548
       GACTCGTTGAACGTGAACTCCTTACCACTTGACCAGTAGGTACTTTTTCCCAAAATGATG
164    L  S  N  L  H  L  R  N  G  E  L  V  I  H  E  K  G  F  Y  Y   183

ATCTATTCCCAAACATACTTTCGATTTCAGGAGGAAATAAAAGAAAACACAAAGAACGAC
549    -+---------+---------+---------+---------+---------+--------  608
       TAGATAAGGGTTTGTATGAAAGCTAAAGTCCTCCTTTATTTTCTTTTGTGTTTCTTGCTG
184    I  Y  S  Q  T  Y  F  R  F  Q  E  E  I  K  E  N  T  K  N  D   203

AAACAAATGGTCCAATATATTTACAAATACACAAGTTATCCTGACCCTATATTGTTGATG
609    -+---------+---------+---------+---------+---------+--------  668
       TTTGTTTACCAGGTTATATAAATGTTTATGTGTTCAATAGGACTGGGATATAACAACTAC
204    K  Q  M  V  Q  Y  I  Y  K  Y  T  S  Y  P  D  P  I  L  L  M   223

AAAAGTGCTAGAAATAGTTGTTGGTCTAAAGATGCAGAATATGGACTCTATTCCATCTAT
669    -+---------+---------+---------+---------+---------+--------  728
       TTTTCACGATCTTTATCAACAACCAGATTTCTACGTCTTATACCTGAGATAAGGTAGATA
224    K  S  A  R  N  S  C  W  S  K  D  A  E  Y  G  L  Y  S  I  Y   243

CAAGGGGGAATATTTGAGCTTAAGGAAAATGACAGAATTTTTGTTTCTGTAACAAATGAG
729    -+---------+---------+---------+---------+---------+--------  788
       GTTCCCCCTTATAAACTCGAATTCCTTTTACTGTCTTAAAAACAAAGACATTGTTTACTC
244    Q  G  G  I  F  E  L  K  E  N  D  R  I  F  V  S  V  T  N  E   263

CACTTGATAGACATGGACCATGAAGCCAGTTTTTTTCGGGGCCTTTTTAGTTGGCTAACTG
789    -+---------+---------+---------+---------+---------+--------  848
       GTGAACTATCTGTACCTGGTACTTCGGTCAAAAAAGCCCCGGAAAAATCAACCGATTGAC
264    H  L  I  D  M  D  H  E  A  S  F  F  G  A  F  L  V  G         281

ACCTGGAAAGAAAAAGCAATAACCTCAAAGTGACTATTCAGTTTTCAGGATGATACACTA
849    -+---------+---------+---------+---------+---------+--------  908
       TGGACCTTTCTTTTTTCGTTATTGGAGTTTCACTGATAAGTCAAAAGTCCTACTATGTGAT

TGAAGATGTTTCAAAAAATCTGACCAAAACAAACAAACAGAAAACAGAAAACAAAAAAAC
909    -+---------+---------+---------+---------+---------+--------  968
       ACTTCTACAAAGTTTTTTAGACTGGTTTTGTTTGTTTGTCTTTTGTCTTTTGTTTTTTTG

CTCTATGCAATCTGAGTAGAGCAGCCACAACCAAAAAATTCTACAACACACACTGTTCTG
969    -+---------+---------+---------+---------+---------+-------- 1028
       GAGATACGTTAGACTCATCTCGTCGGTGTTGGTTTTTTAAGATGTTGTGTGTGACAAGAC

AAAGTGACTCACTTATCCCAAGAAAATGAAATTGCTGAAAGATCTTTCAGGACTCTACCT
1029   -+---------+---------+---------+---------+---------+-------- 1088
       TTTCACTGAGTGAATAGGGTTCTTTTACTTTAACGACTTTCTAGAAAGTCCTGAGATGGA

CATATCAGTTTGCTAGCAGAAATCTAGAAGACTGTCAGCTTCCAAACATTAATGCAATGG
1089   -+---------+---------+---------+---------+---------+-------- 1148
       GTATAGTCAAACGATCGTCTTTAGATCTTCTGACAGTCGAAGGTTTGTAATTACGTTACC
```

FIG.1B

```
       TTAACATCTTCTGTCTTTATAATCTACTCCTTGTAAAGACTGTAGAAGAAAGCGCAACAA
1149   -+---------+---------+---------+---------+---------+--------  1208
       AATTGTAGAAGACAGAAATATTAGATGAGGAACATTTCTGACATCTTCTTTCGCGTTGTT

TCCATCTCTCAAGTAGTGTATCACAGTAGTAGCCTCCAGGTTTCCTTAAGGGACAACATC
1209   -+---------+---------+---------+---------+---------+--------  1268
       AGGTAGAGAGTTCATCACATAGTGTCATCATCGGAGGTCCAAAGGAATTCCCTGTTGTAG

CTTAAGTCAAAAGAGAGAAGAGGCACCACTAAAAGATCGCAGTTTGCCTGGTGCAGTGGC
1269   -+---------+---------+---------+---------+---------+--------  1328
       GAATTCAGTTTTCTCTCTTCTCCGTGGTGATTTTCTAGCGTCAAACGGACCACGTCACCG

TCACACCTGTAATCCCAACATTTTGGGAACCCAAGGTGGGTAGATCACGAGATCAAGAGA
1329   -+---------+---------+---------+---------+---------+--------  1388
       AGTGTGGACATTAGGGTTGTAAAACCCTTGGGTTCCACCCATCTAGTGCTCTAGTTCTCT

TCAAGACCATAGTGACCAACATAGTGAAACCCCATCTCTACTGAAAGTGCAAAAATTAGC
1389   -+---------+---------+---------+---------+---------+--------  1448
       AGTTCTGGTATCACTGGTTGTATCACTTTGGGGTAGAGATGACTTTCACGTTTTTAATCG

TGGGTGTGTTGGCACATGCCTGTAGTCCCAGCTACTTGAGAGGCTGAGGCAGGAGAATCG
1449   -+---------+---------+---------+---------+---------+--------  1508
       ACCCACACAACCGTGTACGGACATCAGGGTCGATGAACTCTCCGACTCCGTCCTCTTAGC

TTTGAACCCGGGAGGCAGAGGTTGCAGTGTGGTGAGATCATGCCACTACACTCCAGCCTG
1509   -+---------+---------+---------+---------+---------+--------  1568
       AAACTTGGGCCCTCCGTCTCCAACGTCACACCACTCTAGTACGGTGATGTGAGGTCGGAC

GCGACAGAGCGAGACTTGGTTTC
1569   -+---------+---------+-  1591
       CGCTGTCTCGCTCTGAACCAAAG
```

FIG. 1C

Alignment of AIM-I to Human Fas Ligand
(Similarity = 48.594 %   Identity = 22.892 %)

```
  4 MEVQGGPSLGQTCVLIVIFTVL.................LQSLCVAVTYV  36
    ::  ::..::......::..  | :             |.. ...:....
 15 vdssasspwappgtvlpcptsvprrpgqrrppppppppplppppppppplp  64

37 YFTNELKQMQDKYSKSGIACFLKEDDSYWDPNDEESMNSPCWQVKWQLRQ  86
    :.  |...:..: ..|.  |:|   :   . ::.  .:|: ::|..
 65 plp..lpplkkrgnhstglcllvm..ffmvlvalvglglgmfql.fhlqk 109

87 LVRKMILRTSEETISTVQEKQQNISPLVRERGPQRVAAHITGTRGRSNTL 136
    :  .:  .||:   ...  |||  . .. ..|: . | .||:|   |:||.
110 elaelrestsqmhtasslekqighpspppekkelrkvahlt...gksnsr 156

137 SSPNSKNEKALGRKINSWESSRSGHSFLSNLHLRNGELVIHEKGFYYIYS 186
    | |  ..::.            |   :||.:....|:|||:|.|:|::||
157 smplewedty............givllsgvkykkgglvinetglyfvys 193

187 QTYFRFQEEIKENTKNDKQMVQYIYKYTS.YPDPILLMKSARNSCWSKDA 235
    ..|||      :.. |: .: : :|. .| ||:.:::|.. . |: ....
194 kvyfr......gqscnnlplshkvymrnskypqdlvmmegkmmsycttgq 237

236 EYGLYSIYQGGIFELKENDRIFVSVTNEHLIDMDHEASFFGAFLV 280
    ::  | |  |::|:|...|:::|.|.:  |:::::....|||  : :
238 mwar.ssylgavfnltsadhlyvnvselslvnfeesqtffglykl 281
```

FIG.2

Alignment Report of AIM-I, hFas Ligand, TNF-α and TNF-β
by Clustal Method with PAM250 Residue Weight Table

```
              10              20              30
1   M A M M E V Q G G P S L - - - - - G Q T C V L I V I F T V L    AIM 1
1   M Q Q P M N Y P C P Q I F W V D S S A T S S W A P P G S V F    FAS LIGAND
1   M - - - - - - - - - - - - - - - - - - - - - - - - - - - - -    tnfa.pep
1   M - - - - - - - - - - - - - - - - - - - - - T P P E R L F      tnfb.pep 40              50              60
26  L Q S L C V A V T Y V Y F T N E L K Q M Q D K Y S K S G I A    AIM 1
31  P C P S C G P R G - - - - P D Q R R P P P P P P P V S P L P    FAS LIGAND
2   - - - - - - - - - - - - - - - - - - S T E S M I R D V E        tnfa.pep
9   L P R V C G T T - - - - - - - - - - - - - - - - - - - - -      tnfb.pep 70              80              90
56  C F L K E D D S Y W D P N D E E S M N S P C W Q V K W Q L R    AIM 1
57  - - P P S Q P L P L P P L T P L K K K D H N T N L W L P V V    FAS LIGAND
12  - - L A E E A L P - - - - - - - - K K T G G P Q G S R R C L    tnfa.pep
17  - - - - - - - - - - - - - - - - - - - - - - - - L W L L        tnfb.pep 100             110             120
86  Q L V R K M I L R T S E E T I S T V Q E K Q Q N I S P L V R    AIM 1
85  F F M V L V A L V G M G L G - M Y Q L F H L Q K E L A E L R    FAS LIGAND
32  F L S L F S F L I V A G A T L F C L L H F G V I G P Q R E      tnfa.pep
21  L L G L L L V L - - - - - - - - - - - - - - - L P G A Q        tnfb.pep 130             140             150
116 E K G P Q R V A A H I T G T R G R S N T L S S P N S K N E K    AIM 1
114 E F T - N Q S L K V S S F E K Q I A N P S T P S E K K E P R    FAS LIGAND
62  E S P R D L S L I S P L A Q A V R S S S R T P S D - - - - K    tnfa.pep
34  G L P - G V G L T P S A A Q T A R Q H P K M H L A H S T L K    tnfb.pep 160             170             180
146 A L G R K I N S - - - - - - - - - - W E S S R S G H S F L S N  AIM 1
143 S V A H L T G N P H S R S I P L E W E D T Y G T A L I - S G    FAS LIGAND
88  P V A H V V A N P Q A E G Q - L Q W L N R R A N A L L A N G    tnfa.pep
63  P A A H L I G D P - S K Q N S L L W R A N T D R A F L Q D C    tnfb.pep
```

FIG.3A

```
            190              200              210
167  L H L R N G K L V I H E K G F Y Y I Y S Q T Y F R F Q E E I      AIM 1
172  V K Y K K G G L V I N E T G L Y F V Y S K V Y F R G Q S C N      FAS LIGAND
117  V E L R D N Q L V V P S E G L Y L I Y S Q V L F K G Q S C -      tnfa.pep
 92  F S L S N N S L L V P T S G I Y F V Y S Q V V F S C K A Y S      tnfb.pep 220              230              240
197  K E N T K N D K Q M V Q Y I Y K Y T S - Y P D P I L L M K S      AIM 1
202  N Q P - - - - - - L N H K V Y M R N S K Y P E D L V L M E E      FAS LIGAND
146  - - - P S T H V L L T H T I S R I A V S Y Q T K V N L L S A      tnfa.pep
122  P K A P S S P L Y L A H E V Q L F S S Q Y P F H V P L L S S      tnfb.pep 250              260              270
226  A R N S C W S K D A E Y G L - - - - - Y S I Y Q G G I F E L      AIM 1
226  K R L N Y C - - - - - - T T G Q I W A H S S Y L G A V F N L      FAS LIGAND
173  I K S P C Q R E T P E G A E A K P W Y E P I Y L G C V F Q L      tnfa.pep
152  Q K M V Y P - - - - - - G L Q E P W L H S M Y H G A A F Q L      tnfb.pep 280              290              300
251  K E N D R I F V S V T N E H L I D K D H E A S - F F G A F L      AIM 1
250  T S A D H L Y V N I S Q L S L I N F E E S - K T F F G L Y -      FAS LIGAND
203  E K G D R L S A E I N R P D Y L D F A E S G Q V Y F G I I -      tnfa.pep
176  T Q G D Q L S T R T D G I P H L V L S P S - T V F F G A F -      tnfb.pep 280  V G -                                                            AIM 1
278  - K L                                                            FAS LIGAND
232  - A L                                                            tnfa.pep
204  - A L                                                            tnfb.pep
```

Decoration 'Decoration #1': Box residues that match the
Consensus within 2 distance units.

FIG.3B

DISTRIBUTED CONVERTER AND METHOD FOR EQUALIZING LITHIUM-ION BATTERIES

CROSS-REFERENCE TO RELATED APPLICATIONS

This application is cross-referenced to application Ser. No. 09/816,982 "AC Power System With Redundant AC Power Sources" that is being filed simultaneously with the present application.

TECHNICAL FIELD

The present invention relates generally to lithium-ion battery systems, and more particularly to a distributed converter for balancing charge in a lithium-ion battery system.

BACKGROUND ART

A spacecraft may require the use of as many as four lithium-ion batteries and a typical lithium-ion battery has about thirty cell units. A common approach for charging and balancing charge in the batteries uses a power supply for each cell unit of each battery for a total of one hundred and twenty power supplies that are used on board a spacecraft.

This is a complex, and costly, approach to charging lithium-ion batteries, especially for space applications, which are highly sensitive to weight and packaging constraints and require extreme levels of reliability. The large number of components in the typical battery system adversely affects the reliability of the battery system and ultimately the satellite itself. There is a need for a low cost and effective method of charging the cell units and balancing the charge of the cell units of lithium-ion batteries used on board a spacecraft.

SUMMARY OF THE INVENTION

It is an object of the present invention to provide a method for charging and balancing the cells of a lithium-ion battery. It is another object of the present invention to reduce the cost and complexity of the charging and equalization system.

It is a further object of the present invention to provide reliable and efficient control of cell charge balancing, eliminating the need for a separate power supply and charger for each cell in a lithium-ion battery system.

The present invention is a system and method for charging and balancing charge in a lithium-ion battery having an array of cells. A single bulk charger is used for all of the cells in an array of cells. A controller controls a plurality of balancing switches based on a measured voltage for each cell. A redundant alternating-current power supply is used for the plurality of equalizing switches.

According to the method of the present invention, the battery is charged by the bulk charger at a high rate until one or more of the cells reaches a predetermined series threshold voltage. When the series threshold voltage is reached, the controller provides instructions as to whether to reduce or terminate the cell charging by the bulk charger. At this point in time, the redundant power supplies begin charging each cell individually through the balancing switches. The balancing switches will turn off as their respective cells reach a predetermined cell threshold voltage. Ultimately, each cell will be fully charged to an identical high charge state.

These and other features of the present invention will be better understood with regard to the following description, appended claims, and accompanying drawings.

BRIEF DESCRIPTION OF THE DRAWINGS

FIG. 2 is a flow chart of the method of the present invention;

FIG. 3 is a flow chart of charge balancing according to the method of the present invention.

BEST MODE FOR CARRYING OUT THE INVENTION

Figure 1:
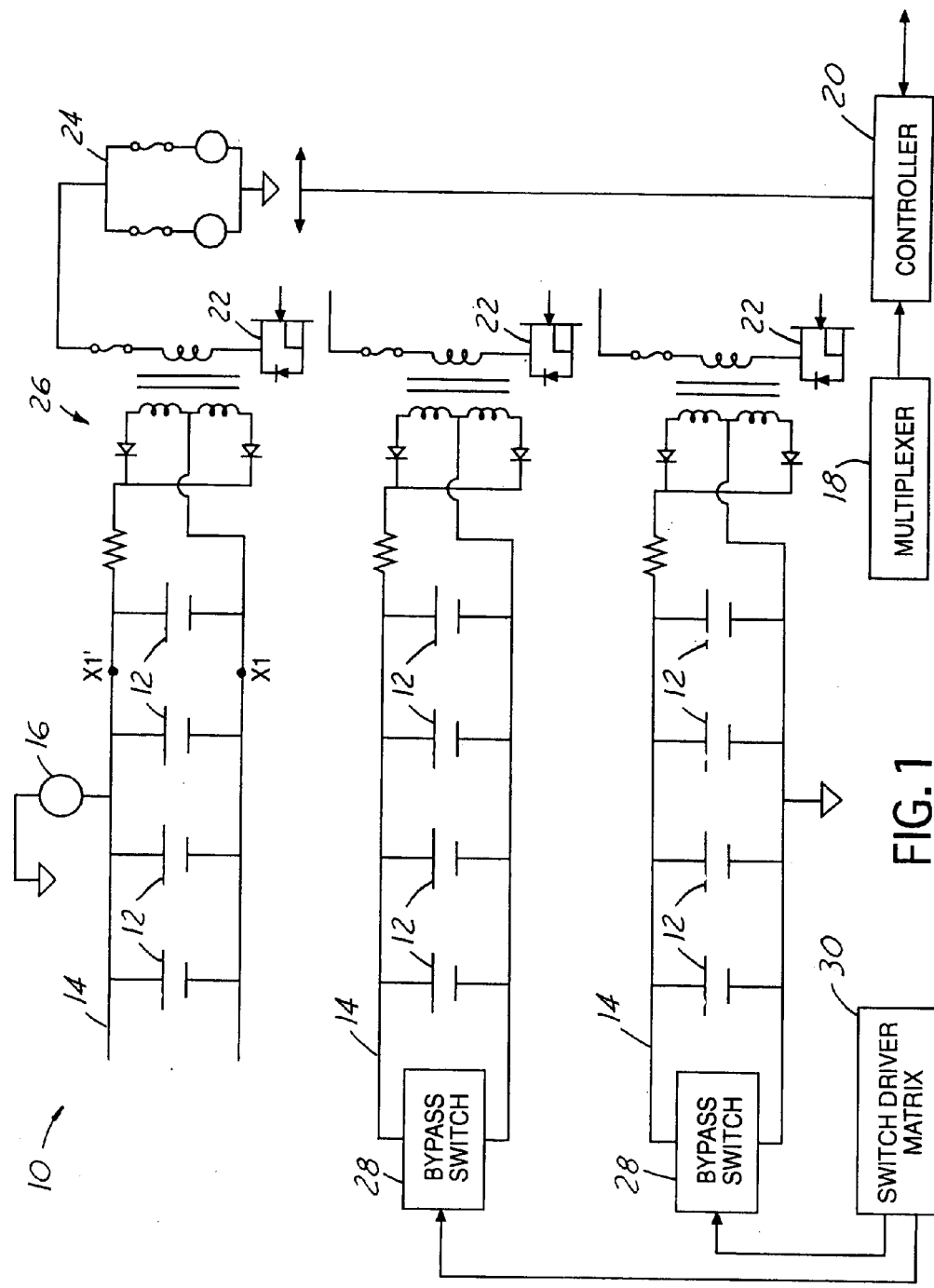
FIG. 1 is a block diagram of the system of the present invention.

The present invention is being described herein with reference to a satellite application. However, it should be noted that the present example in no way limits the present application from being used in other applications not described herein. Referring to FIG. 1 there is shown a block diagram of a lithium-ion battery system 10 having a plurality of cell units 12 arranged in an array. A plurality of cell units 12 are arranged in parallel creating cell 14 and then one or more cells 14 are arranged in series with each other, thereby forming the array of cell units 12.

For example purposes, FIG. 1 shows an array of cell units 12 as a group of four cell units 12 in parallel forming the cell 14, and three cells 14 in series forming the array. It should be noted however that this is for example purposes only and that other variations are possible but too numerous to mention herein. One skilled in the art is capable of substituting many alternatives to the arrangement shown herein without departing from the scope of the present invention.

A single bulk charger 16 is connected to the array of cell units 12. The bulk charger 16 charges the cells 14 at a high rate, i.e. 0.1 "C" to 0.05 "C". A multiplexer 18 is used to measure the voltage of each cell 14. A differential voltage measurement is taken at X1 and X1' shown in FIG. 1. The measured voltages are supplied to a controller 20 that controls the charging and balancing. In the space application being described herein, the controller communicates with a control processor (not shown) for a satellite (also not shown).

A plurality of balancing switches 22 are connected to a plurality of transformer/rectifier circuits 26 and provide individual control of the cells 14. A redundant alternating-current (AC) power source 24 supplies power to the plurality of transformer/rectifier circuits 26 that are controlled by the plurality of equalization switches 22. Each transformer/rectifier circuit 26 has a respective equalization switch 22 and a respective cell 14. The entire array of circuits 26 and switches 22 is connected to the redundant AC power source 24.

If required, it is possible to provide a cell bypass switch 28 which is typically a relay and is controlled by a switch driver matrix 30. Bypassing a cell may be necessary in instances where a plurality of the cell units have failed, making the cell unusable.

The method of the present invention will be described herein with reference to FIG. 2, which is a flow chart. For the example being presented herein, the method 100 begins at the conclusion of eclipse for a spacecraft. The controller directs the bulk charger to initiate charging 102 the battery at a high rate until at least one cell in the array reaches a first predetermined threshold voltage. The cell voltage is measured 104 by the multiplexer and supplied to the controller where it is determined whether or not it meets the first predetermined threshold voltage requirement.

The first predetermined threshold voltage may be a fixed voltage, or a variable voltage. In the case of a variable voltage, the voltage may be a function of several factors associated with the present application. For example, in satellite application, the variable voltage may be a function of the satellite age and the particular season of the year associated with the satellite's orbit for a given point in time.

When the first predetermined threshold requirement has been met, the controller modifies 106 the bulk charger's rate of charge. The rate can be either reduced 108 or terminated 110. In either event, reducing 108 the rate of charge or terminating charging 110, the modification to the bulk charger initiates the activation of charge balancing 112.

FIG. 3 is a flow diagram of the charge balancing 112 method according to the present invention. Charge balancing 112 begins by supplying 114 AC power to all of the transformer/rectifier circuits simultaneously from the redundant power supply. The redundant power supply is used for all of the transformer/rectifier circuits and all of the balancing switches are turned "ON". In a preferred embodiment, the redundant AC power source is operated at a relatively low frequency, i.e. 100 kHz.

The multiplexer measures 116 the voltage of each of the cells 14 and supplies the measured voltages to the controller. The controller monitors when a cell reaches a second predetermined threshold voltage 118, its respective transformer/rectifier circuit is deactivated 120 by having the controller turn the respective balancing switch "OFF". The transformer/rectifier circuits are successively turned off until all of the cells are identically charged to a high charge state.

The second predetermined threshold voltage may be different than the first predetermined threshold voltage that is used to control the bulk charger and the second predetermined threshold voltage may be fixed or variable. Each cell may have its own respective second predetermined threshold voltage. Further, it may be advantageous for the respective second predetermined voltages to be variable as well.

The variable second predetermined voltage is a function of many factors including but not limited to satellite age or season. The variable voltage provides efficient operation of the satellite as it takes into account the factors mentioned above, which have an effect on the operation of the satellite and its power requirements.

Figure 4:
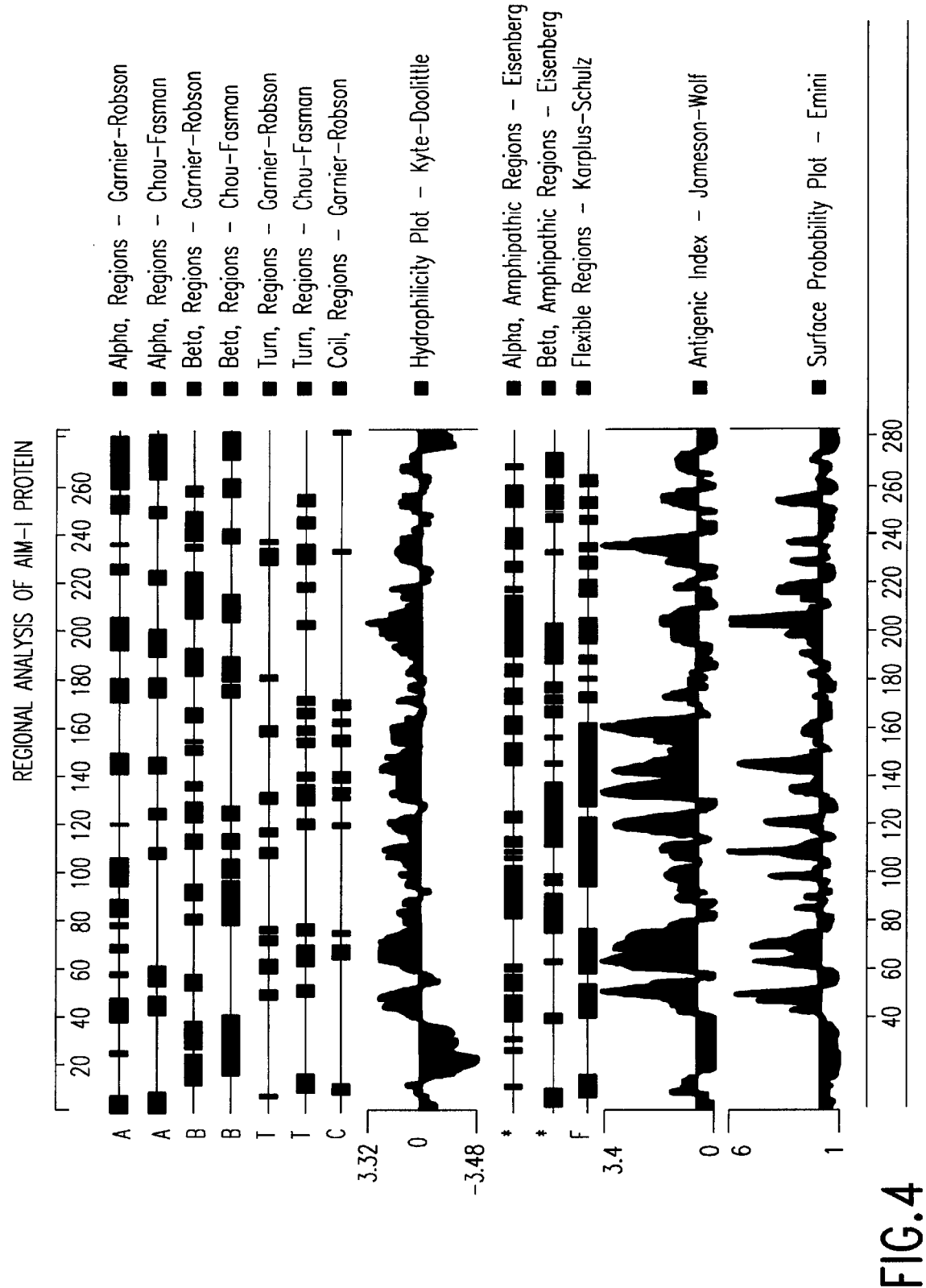
FIG. 4 is a flow chart of trickle charging according to another embodiment of the present invention.

In another embodiment of the present invention, shown in FIG. 4, the transformer/rectifier circuits and charge balancing switches can be used to trickle charge 200 the cells. The cells each have a self-discharge rate, and trickle charging replenishes the cells as they naturally discharge. In this embodiment, the AC voltage source is adjusted 202, or turned back "ON", and all of the balancing switches are turned "ON" 204. The cells are then trickle charged 206 to counteract the self-discharge.

The present invention uses a redundant AC power source for all of the cells as opposed to a power source for each cell, which significantly reduces the number of components in the lithium-ion battery system. Thereby reducing weight, complexity, and cost while improving reliability.

The use of a low frequency AC source reduces the sensitivity of the circuit, which prevents the circuit from being affected by stray or distributed elements. In applying the method and system of the present invention, should a transformer or diode in the transformer/rectifier circuits fail, the failed circuit can be removed without affecting the proper operation or balance of the system.

The present invention is intended to embrace all alternatives, modifications and variations that fall within the spirit and scope of the appended claims.

What is claimed is:

1. A distributed converter for balancing charge in a lithium-ion battery comprising:
   an array of cells having a predetermined number of cell units in parallel forming a cell, each of said cells has a predetermined number of cell units arranged in parallel, thereby forming said array of cells;
   a bulk charger for charging at least one cell in said array of cell units to a first predetermined threshold voltage;
   a multiplexer for measuring a voltage of each of said cells in said array of cell units;
   a plurality of transformer/rectifier circuits, each transformer/rectifier circuit in said plurality of transformer/rectifier circuits being associated with a respective cell in said array of cell units;
   a plurality of balancing switches, each equalizing switch in said plurality of balancing switches being associated with a respective transformer/rectifier circuit in said plurality of transformer/rectifier circuits;
   a redundant AC power supply supplying power to said plurality of transformer/rectifier circuits; and
   a controller for receiving measured voltages from said multiplexer and for controlling an on/off state for each of said plurality of balancing switches, whereby charging and balancing of a cell in said array of cell units occurs when a respective balancing switch is in an "on" state until said respective cell reaches a second predetermined threshold voltage.

2. The system as claimed in claim 1 wherein said redundant AC power supply is operated a low frequency.

3. The system as claimed in claim 2 wherein said low frequency is on the order of 10 kHz.

4. The system as claimed in claim 1 wherein each of said series of cells further comprises a bypass switch.

5. The system as claimed in claim 1 wherein said first and second predetermined threshold voltages are fixed voltages.

6. The system as claimed in claim 1 wherein said first and second predetermined threshold voltages are variable voltages.

7. The system as claimed in claim 1 wherein said second predetermined threshold voltage further comprises a plurality of second predetermined threshold voltages wherein each second predetermined threshold voltage is associated with each cell in said array of cell units.

8. The systems as claimed in claim 7 wherein each of said respective second predetermined threshold voltages are variable.

9. A distributed converter for equalizing a lithium-ion battery on board a satellite in a earth orbit comprising:
   an array of cell units having a predetermined number of cell units in parallel forming a cell and a predetermined number of cells arranged in series, thereby forming said array of cell units;
   a bulk charger for charging said array of cell units to a first predetermined threshold voltage;
   a plurality of transformer/rectifier circuits, each transformer/rectifier circuit in said plurality of transformer/rectifier circuits being associated with a respective cell in said array of cell units; and
   a controller for controlling said bulk charger to charge each of said series of cells to a first predetermined threshold voltage, for controlling each of said plurality of transformer/rectifier circuits until each of said respective cells reaches a second predetermined threshold voltage, at which time said controller deactivates said transformer/rectifier circuit until all of said respective cells in said array of cell units reaches said second predetermined threshold voltage.

10. The system as claimed in claim 9 further comprising a plurality of balancing switches wherein each of said plurality of transformer/rectifier circuits has a respective balancing switch.

11. The system as claimed in claim 9 further comprising a multiplexer for measuring a voltage of said cell and communicating said measured voltage to said controller.

12. The system as claimed in claim 9 wherein each of said cells further comprises a bypass switch.

13. The system as claimed in claim 9 wherein said first predetermined threshold voltage is a fixed voltage.

14. The system as claimed in claim 9 wherein said first predetermined threshold voltage is a variable voltage.

15. The system as claimed in claim 14 wherein said variable voltage is a function of an age of the satellite and a relative location of the satellite with respect to the sun.

16. The system as claimed in claim 9 wherein said second predetermined threshold voltage is a fixed voltage.

17. The system as claimed in claim 9 wherein said second predetermined threshold voltage is a variable voltage.

18. The system as claimed in claim 9 wherein said second predetermined voltage further comprises a plurality of second predetermined threshold voltages wherein each of said cells in said array of cell units has a respective second predetermined threshold voltage.

19. The system as claimed in claim 18 wherein said plurality of second predetermined threshold voltages for each of said cells in said array of cell units is variable.

20. The system as claimed in claim 19 wherein said variable voltage is a function of an age of the satellite and a relative location of the satellite with respect to the sun.

21. A method for charging and equalizing a lithium-ion battery system having an array of cell units having a predetermined number of cell units in parallel forming a cell and a predetermined number of cells arranged in series, thereby forming the array of cells, a bulk charger, a plurality of transformer/rectifier circuits, each transformer/rectifier circuit in the plurality of transformer/rectifier circuits being associated with a respective cell in the array of cell units, and a controller, said method comprising the steps of:

charging the array of cell units at a high rate using the bulk charger; measuring the voltage of each cell in the array of cell units;

determining when at least one cell has reached a first predetermined threshold voltage;

modifying a rate of charge of the bulk charger;

applying AC power to each of the transformer/rectifier circuits simultaneously;

measuring the voltage of each cell in the array of cell units;

determining when a cell has reached a second predetermined threshold voltage;

discontinuing AC power to a respective transformer/rectifier circuit for said cell having a voltage meeting said second predetermined threshold voltage.

22. The method as claimed in claim 21 wherein the battery system has a plurality of balancing switches and each transformer/rectifier circuit has a respective balancing switch and wherein after AC power has been discontinued to all of the transformer/rectifier circuits, said method further comprises the steps of:

activating AC power to all of the transformer/rectifier circuits; and closing all of the balancing switches in the plurality of balancing switches for trickle charging the cells.

* * * * *

UNITED STATES PATENT AND TRADEMARK OFFICE
CERTIFICATE OF CORRECTION

PATENT NO. : 6,369,546 B1
DATED : April 9, 2002
INVENTOR(S) : Stanley Canter

It is certified that error appears in the above-identified patent and that said Letters Patent is hereby corrected as shown below:

<u>Title page,</u>
After ABSTRACT, "22 Claims, 7 Drawing Sheets" should be replaced with
-- 22 Claims, 2 Drawing Sheets --.

<u>Drawings,</u>
The drawing Figures 1A, 1B, 1C, 2, 3A, 3B and 4 (Sheets 1-7) should be replaced with the attached Figures 1-4 (Sheets 1 and 2 ).

Signed and Sealed this

Seventeenth Day of December, 2002

JAMES E. ROGAN
*Director of the United States Patent and Trademark Office*

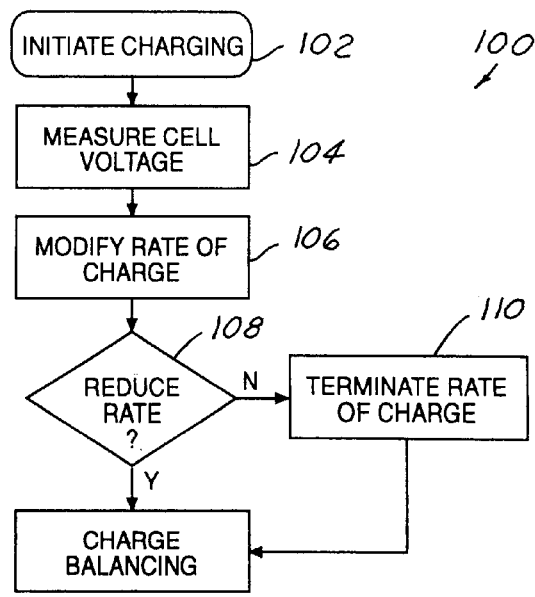
FIG. 2
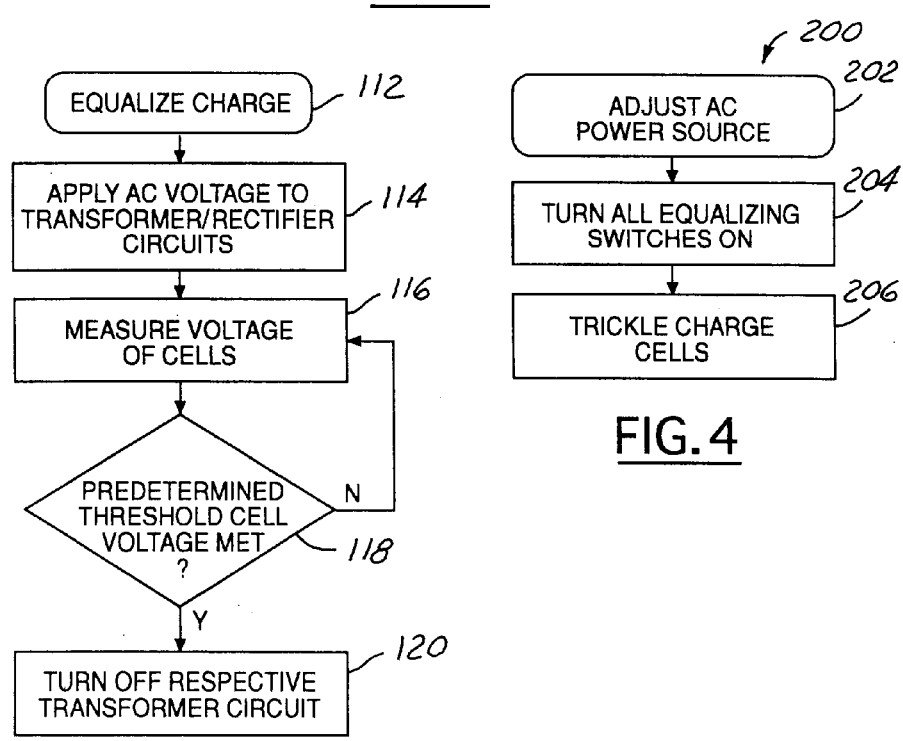
FIG. 3
FIG. 4